US010023210B2

(12) United States Patent
Brousseau et al.

(10) Patent No.: US 10,023,210 B2
(45) Date of Patent: Jul. 17, 2018

(54) DEVICES, SYSTEMS, AND METHODS RELATED TO TRACKING LOCATION OF OPERATOR CONTROL UNITS FOR LOCOMOTIVES

(71) Applicant: Laird Technologies, Inc., Earth City, MO (US)

(72) Inventors: André Brousseau, Québec (CA); Jeremy Jovenall, Mercer, PA (US)

(73) Assignee: Laird Technologies, Inc., Earth City, MO (US)

( * ) Notice: Subject to any disclaimer, the term of this patent is extended or adjusted under 35 U.S.C. 154(b) by 147 days.

(21) Appl. No.: 14/615,573

(22) Filed: Feb. 6, 2015

(65) Prior Publication Data

US 2016/0229434 A1   Aug. 11, 2016

(51) Int. Cl.
| | |
|---|---|
| *B61L 3/12* | (2006.01) |
| *B61L 23/08* | (2006.01) |
| *B61L 25/02* | (2006.01) |
| *B61L 27/00* | (2006.01) |
| *G01S 19/13* | (2010.01) |
| *G01S 19/14* | (2010.01) |
| *B61L 15/00* | (2006.01) |

(52) U.S. Cl.
CPC ............ *B61L 3/127* (2013.01); *B61L 15/0027* (2013.01); *B61L 23/08* (2013.01); *B61L 25/025* (2013.01); *B61L 27/0077* (2013.01); *G01S 19/13* (2013.01); *G01S 19/14* (2013.01); *B61L 2205/04* (2013.01)

(58) Field of Classification Search
CPC ................................. B61L 3/125; B61L 3/127
See application file for complete search history.

(56) References Cited

U.S. PATENT DOCUMENTS

| | | | | |
|---|---|---|---|---|
| 5,889,790 | A | * | 3/1999 | Fukuda ................ H04L 1/0083 714/18 |
| 6,222,484 | B1 | | 4/2001 | Seiple et al. |

(Continued)

FOREIGN PATENT DOCUMENTS

EP          1186904          3/2002

OTHER PUBLICATIONS

International Search Report and Written Opinion dated May 24, 2016 for PCT Application No. PCT/US2016/016687 filed Feb. 5, 2016 which claims priority to the instant application, 12 pages.

*Primary Examiner* — Jelani A Smith
*Assistant Examiner* — Donald J Wallace
(74) *Attorney, Agent, or Firm* — Harness, Dickey & Pierce, P.L.C.

(57) ABSTRACT

According to various aspects, exemplary embodiments are disclosed of devices, systems, and methods related to tracking location of operator control units for locomotives. In an exemplary embodiment, an operator control unit includes a user interface configured to receive one or more commands from an operator for controlling a locomotive. The operator control unit also includes a global positioning system (GPS) receiver configured to receive location information of the operator control unit, and a wireless communication device. The wireless communication device is configured to transmit command data corresponding to the one or more commands and location data corresponding to the location information to a machine control unit on the locomotive.

15 Claims, 2 Drawing Sheets

(56) References Cited

U.S. PATENT DOCUMENTS

Figure 1:
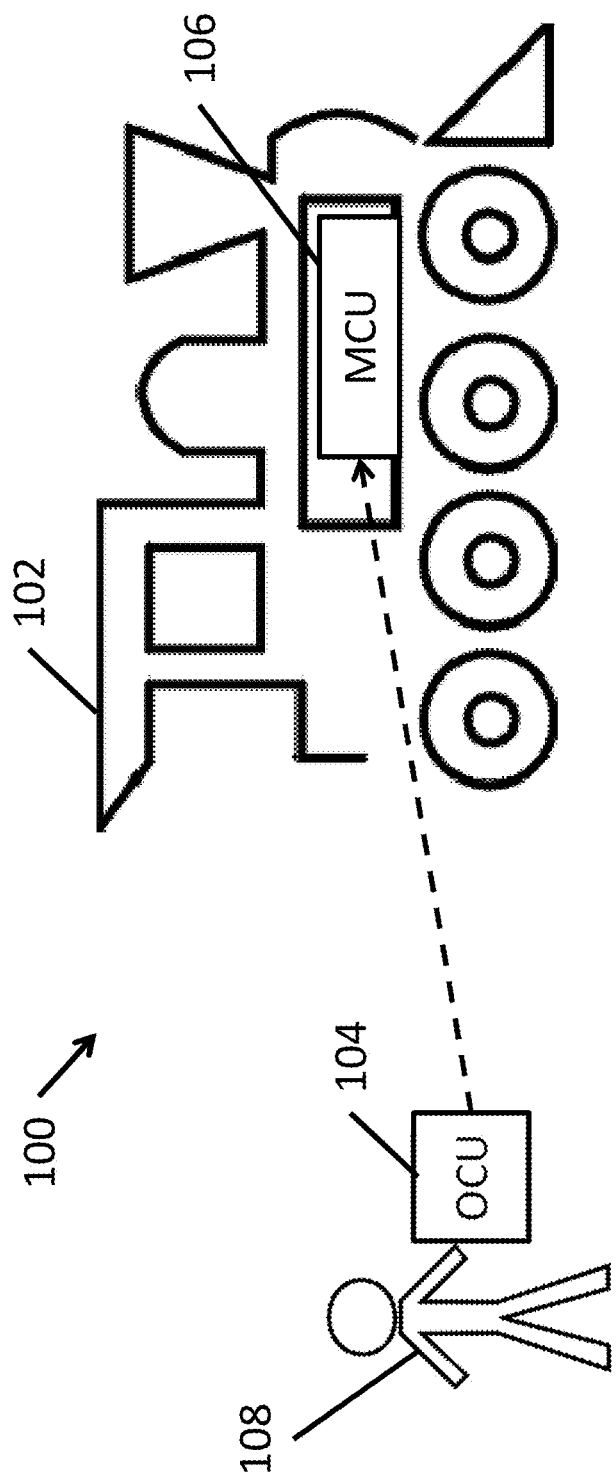

| | | | |
|---|---|---|---|
| 6,292,751 B1* | 9/2001 | Frank | G01C 21/16 |
| | | | 701/505 |
| 6,853,890 B1 | 2/2005 | Horst et al. | |
| 7,239,943 B2 | 7/2007 | Peltz | |
| 7,529,201 B2 | 5/2009 | Aiken, II et al. | |
| 8,509,964 B2 | 8/2013 | Ecton et al. | |
| 2002/0146082 A1* | 10/2002 | Horst | B61L 3/127 |
| | | | 375/354 |
| 2004/0088086 A1* | 5/2004 | Horst | B61L 3/127 |
| | | | 701/19 |
| 2006/0015223 A1 | 1/2006 | LeBlanc et al. | |
| 2007/0069918 A1* | 3/2007 | You | G08C 23/04 |
| | | | 340/12.34 |
| 2009/0248223 A1 | 10/2009 | Ecton et al. | |
| 2010/0168941 A1* | 7/2010 | Geiger | B61L 3/127 |
| | | | 701/20 |
| 2010/0277310 A1 | 11/2010 | Imae | |
| 2011/0251737 A1* | 10/2011 | Ecton | B61L 3/127 |
| | | | 701/2 |
| 2013/0311004 A1* | 11/2013 | Okamura | G05D 1/0033 |
| | | | 701/2 |

* cited by examiner

DEVICES, SYSTEMS, AND METHODS RELATED TO TRACKING LOCATION OF OPERATOR CONTROL UNITS FOR LOCOMOTIVES

FIELD

The present disclosure generally relates to devices, systems, and methods related to tracking location of operator control units for locomotives.

BACKGROUND

This section provides background information related to the present disclosure which is not necessarily prior art.

A locomotive may include a machine control unit (MCU) configured to control one or more aspects of the locomotive, including starting, stopping, speed, braking, switching, etc. Operators may use an operator control unit (OCU) to control the locomotive. The operator control unit may send commands, instructions, etc. to the master control unit via a wireless network to control the locomotive. In some configurations, the machine control unit may send messages back to the operator control unit to relay feedback and other messages.

SUMMARY

This section provides a general summary of the disclosure, and is not a comprehensive disclosure of its full scope or all of its features.

According to various aspects, exemplary embodiments are disclosed of devices, systems, and methods related to tracking location of operator control units for locomotives. In an exemplary embodiment, an operator control unit includes a user interface configured to receive one or more commands from an operator for controlling a locomotive. The operator control unit also includes a global positioning system (GPS) receiver configured to receive location information of the operator control unit, and a wireless communication device. The wireless communication device is configured to transmit command data corresponding to the one or more commands and location data corresponding to the location information to a machine control unit on the locomotive.

In another exemplary embodiment, a location system for a remote control unit of a locomotive generally includes a locomotive having a machine control unit, and a remote control unit configured to receive one or more commands for controlling the locomotive. The system also includes a global positioning system (GPS) antenna coupled to the remote control unit and configured to receive location information related to the location of the remote control unit. The system further includes a wireless network antenna coupled to the remote control unit. The wireless network antenna is configured to send command data associated with the one or more commands and location data associated with the received location information to the machine control unit on the locomotive.

In a further exemplary embodiment, a method of monitoring location of an operator control unit corresponding to a locomotive is disclosed. The exemplary method generally includes receiving a command from an operator control unit associated with an operator. The command is related to controlling a locomotive. The method also includes retrieving a location of the operator control unit, and transmitting a command data message corresponding to the command and a location data message corresponding to the location of the operator control unit to a machine control unit on the locomotive.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
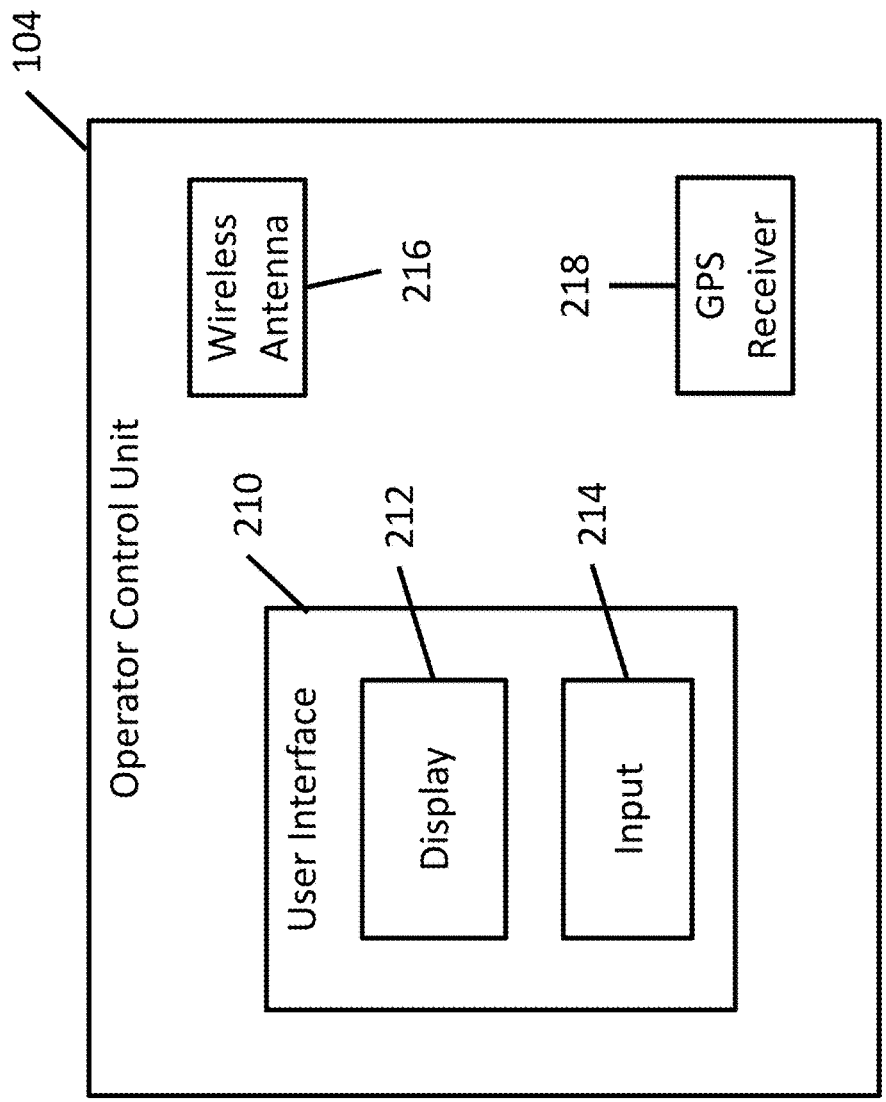

FIG. 1 is a block diagram of an example system for tracking location of an operator control unit for a locomotive; and FIG. 2 is another block diagram of the example operator control unit of FIG. 1.

Corresponding reference numerals indicate corresponding parts throughout the several views of the drawings

DETAILED DESCRIPTION

Example embodiments will now be described more fully with reference to the accompanying drawings.

The inventors have recognized that by adding location information (e.g., via a global positioning system (GPS) receiver, etc.) to an operator control unit (OCU) for a locomotive, a machine control unit (MCU) for the locomotive may be able to determine where the operator control unit is located. For example, the operator control unit may transmit the location of the OCU to the machine control unit located at the locomotive, through an existing wireless network channel (e.g., radio frequency (RF), etc.).

The inventors have also recognized that forwarding operator control unit positional data to the machine control unit can be a challenge, due to the amount of data bytes that must be transferred to the MCU, etc. Existing RF communication channels and protocols may be fully used for transferring switch, command, etc. data from the operator control unit to the machine control unit, such that adding another RF communication channel would be complicated and expensive.

Disclosed herein are exemplary embodiments of devices, systems, and methods related to tracking location of operator control units for locomotives. In an exemplary embodiment, an operator control unit includes a user interface configured to receive one or more commands from an operator for controlling a locomotive. The operator control unit also includes a global positioning system (GPS) receiver configured to receive location information of the operator control unit, and a wireless communication device. The wireless communication device is configured to transmit command data corresponding to the one or more commands and location data corresponding to the location information to a machine control unit on the locomotive.

The operator control unit may be any suitable controller for sending commands to control a locomotive (e.g., train, engine, etc.), including a remote control, a locomotive control, a locomotive operation device, etc. The operator control unit may send any suitable commands, including switch commands, brake commands, speed commands, direction, bell, horn, headlight, sand, status requests, motion detection, tilt detection, pitch and catch, low battery voltage condition, fault detection, etc. Accordingly, the operator control unit may allow an operator (e.g., user, locomotive control person, engineer, rail yard coordinator, etc.) to control movement and/or other functions of the locomotive.

The operator control unit may include any suitable user interface for receiving commands and/or other input from an operator, including a touch screen interface, keypad, buttons, etc. The operator control unit may include a display, lights, light emitting diodes (LEDs), indicators, etc. for displaying information to the operator. The operator control unit may include one or more processors, memory (e.g., one or more hard disks, flash memory, solid state memory, random access memory, read only memory, etc.), etc. configured to operate the OCU and store information related to operation of the OCU. The operator control unit may include one or more wireless communication devices, antennas, etc. for wireless communication. The operator control unit may also include any suitable element, device, etc. for determining a location of the OCU, including a global positioning system (GPS) antenna, receiver, etc. In some embodiments, the operator control unit may include an audible alert device to notify an operator of one or more different conditions.

The operator control unit may control the locomotive via wireless signals transmitted to a machine control unit located at the locomotive. The machine control unit may be any suitable controller for controlling operation of the locomotive and may be coupled to one or more systems of the locomotive including a braking system, an engine and/or driving system, a switching system, a navigational system, etc. The machine control unit may be mounted on the locomotive, included inside the locomotive, attached to the locomotive, incorporated into the locomotive, etc. In some embodiments, the machine control unit may not include any portions that are not located on the locomotive and/or other parts of the train.

As stated above, the operator control unit may transmit commands, data, messages, signals, etc. to the machine control unit via a wireless network. The wireless network may be any suitable wireless network, including RF, WiFi, Bluetooth, etc. In some embodiments, the operator control unit may transmit (e.g., send, etc.) signals to the machine control unit via one-way communication, such that the OCU does not receive signals back from the machine control unit. In other embodiments, the operator control unit may send and receive signals from the machine control unit via two-way communication between the OCU and the MCU. In some embodiments, the operator control unit may send command signals only to the machine control unit, may not send command signals to any central station or location not located at the locomotive, etc.

Command data may be transmitted from the operator control unit to the machine control unit via any suitable protocol, including RF channels, etc. For example, the command data may be transmitted in one or more messages which may be included in one or more RF packets and transmitted on an RF channel. Existing protocols may use substantially all of the bandwidth of an RF channel for transmitting the command data. Some embodiments of the present disclosure may add a GPS element to the operator control unit and transmit the OCU's geographical location through the existing RF channel back to the locomotive's machine control unit, thus allowing the MCU to know where the OCU and its operator are located.

In order to use an existing RF channel, in some embodiments the operator control unit may wait until a same command message is sent for a short period of time (e.g., repeated more than a predetermined number of times in succession, etc.) and then send GPS positional information instead of the command message. For example, if the operator control unit does not have any switch changes for a short period, the OCU may send a location data message to the MCU during one or more packets, windows, etc. of the RF channel, instead of continuing to transmit the same command data message. Thereafter, the OCU may resume sending the same command data message, continue sending the location data message until a new command data message is generated, etc. This may allow the operator control unit to transmit location data messages without having to add another RF communication channel, while still preserving the existing command data messages. Thus, in some embodiments, location data and command data may be transmitted via the same RF channel.

As described above, in some embodiments, the operator control unit may modify the protocol such that the OCU can transmit switch, command, etc. data and OCU positional data. The operator control unit may send location data (e.g., positional data, etc.) only after a command data message has remained stable long enough for the machine control unit to have received it. For example, a command data message may need to remain constant for a certain time period threshold, be retransmitted a predetermined number of times, etc. in order to provide sufficient certainty that the command data message will successfully reach the machine control unit. Thereafter, the operator control unit may transmit a location data message instead of continuing to transmit the command data message beyond the period of time necessary to provide a stable transmission of the command data message. The operator control unit may transmit the location data message for a long enough period to provide a stable transmission of the location data message to the machine control unit, and then continue transmitting the location data message, retransmit the command data message, wait for a new command data message, etc.

In some embodiments, the operator control unit and the machine control unit may have two-way communications. The machine control unit may tell the operator control unit if the last packet the OCU sent to the MCU was received successfully or not (e.g., send an acknowledgement, confirmation, etc.). With this information, the operator control unit may more quickly start sending positional packets, which may reduce the duration for which an unchanged command packet has to be retransmitted, and may increase the number of positional packets transmitted. For example, the operator control unit may be configured to transmit command data until an acknowledgment is received from the machine control unit indicating the last OCU message was received, and then to transmit location data. Accordingly, an OCU may be configured to transition from sending command data to sending location data in the event an acknowledgement is received from the MCU of a successful command data message transmission.

In some embodiments, the location data may include absolute position data for the operator control unit. For example, the location data may include a full latitude and longitude of the operator control unit, full GPS signal information, etc. Alternatively, or in addition, the location data may include relative position data for the operator control unit. The relative position data may provide a position of the operator control unit relative to a previously transmitted absolute position of the operator control unit, a previously transmitted relative position of the OCU, etc. For example, the operator control unit may first transmit a location data message including an absolute position of the OCU. Next, the operator control unit may transmit a location data message including a relative position data indicative of a relative change in position from the previous absolute position data. The operator control unit may then transmit another location data message relative to the prior relative position, indicating a change in position from the prior relative position. Accordingly, the operator control unit may first transmit (or occasionally transmit, etc.) an absolute position of the OCU, followed by one or more transmissions of relative OCU position. The relative position data may include less data (e.g., fewer bytes, etc.) than the absolute position data, such that transmitting relative position data requires less bandwidth, less time, fewer packets, etc. as compared to transmitting absolute position data. The location data messages may be transmitted at any desired interval, which may be the same or different between each transmission.

In some embodiments, the operator control unit and machine control unit may include infrared transceivers. The operator control unit may link with the machine control unit via an OCU assignment session. During this operator control unit assignment session, the OCU and the machine control unit may exchange information using their infrared transceivers. The reference absolute GPS position may be exchanged between the machine control unit and the operator control unit over the infrared transceiver communication link during the OCU assignment session.

In some embodiments, the operator control unit may break up the location data into multiple RF packets that are transmitted separately, in succession, etc. The machine control unit may then receive the multiple RF packets and reassemble them. Accordingly, the operator control unit may be able to send location data in smaller windows, which may provide less interference with the existing command data messages, while the machine control unit can still combine the packets to receive the full location data message.

The operator control unit may also include other suitable features, including a tilt sensor, etc. For example, a tilt sensor may be used to detect a change in orientation of the operator control unit. The change in orientation may be indicative of a possibility of a fall of the operator carrying the control unit. For example, if the operator carrying the OCU falls and the tilt sensor detects the change in orientation when the operator drops the OCU, is horizontal to the ground, etc., the OCU may transmit this information to the machine control unit and the MCU will know a location of the fallen operator.

With reference to the figures, FIG. 1 illustrates an example system 100 according to some aspects of the present disclosure. The system 100 includes a locomotive 102 having a machine control unit 106, which may include any suitable machine control unit as described herein.

The system 100 also includes an operator control unit 104, which may be any suitable operator control unit as described herein. The operator control unit 104 may receive commands from an operator 108, and transmit the commands to the machine control unit 106 for controlling the locomotive 102.

As shown in FIG. 1, the operator control unit 104 may allow an operator 108 to control the locomotive 102, send commands to the locomotive 102, etc., while the operator 108 is remote from the locomotive 102. Accordingly, the operator 108 may control the locomotive 102 from a variety of suitable positions. In some embodiments, the operator 108 may be required to be within a threshold distance of the locomotive 102, such as in sight of the locomotive 102, within a wireless network signal strength range, etc.

Adding location information to the operator control unit 104 allows the machine control unit 106 to know where the operator control unit 104 and the operator 108 are located. This location information may be helpful in locating the operator 108 in the event of a detected operator fall, troubleshooting RF communication between the operator control unit 104 and the machine control unit 106, optimizing train movement and/or training, incident investigations etc.

By understanding the location of the operator control unit 104, the machine control unit 106 may improve performance, make better decisions, etc. For example, with integration to a CattronConnect™ rail control system, a LairdLink™ rail control system, a Rail Insight™ rail control system, etc. many new features may be available. An improvement in safety may occur by providing the ability to know where the operator 108 is located if the operator control unit 104 enters a tilt timeout state (e.g., indicating the possibility that the operator 108 has fallen, etc.). Knowing a location of the operator 108 may improve RF communication troubleshooting. From an operations standpoint, knowing the location of the operator 108 could improve train movement optimization, be used for training purposes, etc. During incident investigations, having a record of the location of the operator control unit 104 (and therefore the operator 108) could help in both investigation interpretation and in verification of an operator submitted incident description.

FIG. 1 illustrates a locomotive 102, an operator 108, and an operator control unit 104 in one-way communication with a machine control unit 106. In other embodiments, the system 100 may include more than one locomotive 102, one or more train cars, more than one operator 108 and operator control unit 104, more than one machine control unit 106, an operator control unit in two-way communication with a machine control unit, etc.

FIG. 2 illustrates a block diagram of the operator control unit 104 as shown in FIG. 1. The operator control unit 104 includes a user interface 210 for receiving input (e.g., commands, etc.) from an operator. The user interface may include a display 212, which may include any suitable display (e.g., a liquid crystal display (LCD), light emitting diodes (LED), indicator lights, etc.). Although not shown, in some embodiments the operator control unit may include an audible alert device to notify the operator of one or more different conditions. The user interface may include an input 214, which may include any suitable input (e.g., a keypad, touchscreen, switches, etc.). In other embodiments, the operator control unit 104 may not include a display 212 or an input 214.

The operator control unit also includes a GPS receiver 218, which is configured to receive GPS signals to determine a location of the operator control unit 104. In other embodiments, other suitable devices capable of determining a location of the operator control unit 104 may be used.

The operator control unit 104 also includes a wireless antenna 216. As described above, the wireless antenna 216 may communicate with a machine control unit of a locomotive via one-way or two-way communication, using any suitable wireless communication protocol (e.g., RF, WiFi, Bluetooth, etc.).

According to another example embodiment, an operator control unit device generally includes a user interface configured to receive one or more commands from an operator for controlling a locomotive. The operator control unit also includes a global positioning system (GPS) receiver configured to receive location information of the operator control unit, and a wireless communication device. The wireless communication device is configured to transmit command data corresponding to the one or more commands and location data corresponding to the location information to a machine control unit on the locomotive.

According to another example embodiment, an exemplary method of monitoring location of an operator control unit corresponding to a locomotive is disclosed. The exemplary method generally includes receiving a command from an operator control unit associated with an operator. The command is related to controlling a locomotive. The method also includes retrieving a location of the operator control unit, and transmitting a command data message corresponding to the command and a location data message corresponding to the location of the operator control unit to a machine control unit on the locomotive.

Transmitting may include transmitting the command data message and the location data message to the machine control unit via a radio frequency (RF) channel. In some embodiments, the command data message and location data message may be sent via the same RF channel (e.g., in separate packets, in different time slots, etc.).

Transmitting may include transmitting the location data message instead of the command data message when the command data message is the same for a period of time, only after the command data message has remained stable for a time period sufficient for the machine control unit to receive the command data message, etc. Accordingly, in some embodiments location data messages may only be sent when they will not interfere with command data messages being successfully transmitted to the machine control unit.

The location data message may include relative positional data and/or absolute positional data. For example, absolute positional data may be transmitted first from the OCU to the MCU, and relative positional data may be sent in a later transmission indicating a change in position of the OCU relative to the previously sent absolute positional data. The relative position data may have a smaller size than the absolute position data, such that the relative position data can be transmitted more easily (e.g., with less bandwidth, less packets, in a shorter transmission, etc.). In some embodiments, transmitting the location data may include segmenting the location data message into multiple RF packets to be reassembled by the machine control unit.

Some embodiments may provide one or more advantages including transmission of location data of an operator control unit via a same RF channel as existing command data, avoiding the need to add an additional RF communication channel, saved costs, increased safety for knowing the location of an operator in case of a fall or accident, increased train movement optimization, increased training, incident investigation support, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-2, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An operator control unit comprising:
a user interface configured to receive one or more commands from an operator for controlling a locomotive;
a receiver configured to receive location information of the operator control unit; and
a wireless communication device, the wireless communication device configured to transmit, via a same radio frequency (RF) channel, command data corresponding to the one or more commands and location data corresponding to the location information of the operator control unit to a machine control unit positioned on the locomotive to allow the machine control unit positioned on the locomotive to determine a location of the operator control unit and to use the received location information of the operator control unit to perform at least one of: determining a location of an operator when the operator control unit enters a tilt timeout state, troubleshooting RF communication with the operator control unit, assisting with movement of the locomotive or training of the operator, and recording a location of the operator control unit for an incident investigation;
wherein the wireless communication device is configured to continue transmitting the command data to the machine control unit until an acknowledgement is received from the machine control unit indicating the last command data message was received, and to transition to transmitting the location data to the machine control unit only after the acknowledgement is received from the machine control unit indicating the last command data message was received.

2. The operator control unit of claim 1, wherein the wireless communication device is configured to, when the command data includes a same command data message repeated more than a predetermined number of times in succession, transmit a location data message instead of at least one command data message.

3. The operator control unit of claim 1, wherein the wireless communication device is configured to send location data to the machine control unit only after command data messages have remained stable for a time period sufficient for the machine control unit to receive the command data.

4. The operator control unit of claim 1, wherein the location data includes absolute positional data for the location of the operator control unit.

5. The operator control unit of claim 1, wherein the location data includes relative positional data for the location of the operator control unit, the relative positional data indicative of a change in position of the operator control unit relative to a prior absolute positional data message.

6. The operator control unit of claim 5, wherein the relative positional data includes less bytes of data than absolute positional data.

7. The operator control unit of claim 1, wherein the wireless communication device is configured to break up the location data into multiple RF packets to be reassembled by the machine control unit.

8. The operator control unit of claim 1, further comprising a tilt sensor configured to detect a change in orientation of the operator control unit indicative of a possibility of a fall of the operator carrying the operator control unit.

9. A method of monitoring location of an operator control unit corresponding to a locomotive, the method comprising:
receiving a command at an operator control unit associated with an operator, the command related to controlling a locomotive;
retrieving a location of the operator control unit;
transmitting a command data message corresponding to the command to a machine control unit on the locomotive via a radio frequency (RF) channel; and
only after determining the same command data message corresponding to the command has been transmitted to the machine control unit on the locomotive for a specified time period threshold, transmitting a location data message corresponding to the location of the operator control unit to the machine control unit on the locomotive via the same RF channel, thereby allowing the machine control unit to determine a location of the operator control unit.

10. The method of claim 9, wherein transmitting includes transmitting the location data message to the machine control unit only after command data message has remained stable for the specified time period threshold sufficient for the machine control unit to receive the command data message.

11. The method of claim 9, wherein the location data message includes an absolute position of the operator control unit.

12. The method of claim 9, wherein the location data message includes a relative position of the operator control unit, the relative position indicative of a change in position of the operator control unit relative to a prior absolute position of the operator control unit, and a location data message including the relative position has a smaller data size than a location data message including the absolute position.

13. The method of claim 9, wherein transmitting includes segmenting the location data message into multiple RF packets to be reassembled by the machine control unit.

14. The method of claim 9, further comprising detecting a change in orientation of the operator control unit indicative of a possibility of a fall of the operator carrying the operator control unit.

15. A location system comprising:
a locomotive including a machine control unit;
a remote control unit configured to receive one or more commands for controlling the locomotive;
an antenna coupled to the remote control unit and configured to receive location information related to the location of the remote control unit; and
a wireless network antenna coupled to the remote control unit, the wireless network antenna configured to send, via a same RF channel, command data associated with the one or more commands and location data associated with the received location information to the machine control unit of the locomotive, the location data separated into multiple RF packets that are transmitted separately between existing command data messages, the machine control unit configured to receive the multiple RF packets between the existing command data messages and reassemble the multiple RF packets to determine a location of the operator control unit;

wherein the wireless network antenna is configured to continue transmitting the command data to the machine control unit until an acknowledgement is received from the machine control unit indicating the last command data message was received, and to transition to transmitting the location data to the machine control unit only after the acknowledgement is received from the machine control unit indicating the last command data message was received.

* * * * *